United States Patent [19]

Kuehl

[11] Patent Number: 4,763,572
[45] Date of Patent: Aug. 16, 1988

[54] APPARATUS FOR REMOVING MOISTURE FROM HONEY

[76] Inventor: Lawrence J. Kuehl, Loup City, Nebr. 68853

[21] Appl. No.: 37,933

[22] Filed: Apr. 13, 1987

[51] Int. Cl.⁴ .................................................. A23C 1/00
[52] U.S. Cl. .......................................... 99/476; 34/171; 99/474; 99/483
[58] Field of Search .......................... 99/467, 473–476, 99/483; 34/171, 65, 169, 167, 172

[56] References Cited

U.S. PATENT DOCUMENTS

| 991,871 | 5/1911 | Merritt | 34/171 |
| 3,060,589 | 10/1962 | Wallin | 34/171 |
| 3,158,448 | 11/1964 | Wallin et al. | 34/171 |
| 3,686,773 | 8/1972 | Schreiner | 34/171 X |
| 4,536,973 | 8/1985 | Platt, Jr. et al. | 99/483 X |

FOREIGN PATENT DOCUMENTS 493724  5/1919  France ........................... 99/476

Primary Examiner—Timothy F. Simone
Attorney, Agent, or Firm—Zarley, McKee, Thomte, Voorhees & Sease

[57] ABSTRACT

An apparatus for reducing the moisture content of liquid honey includes an enclosed housing with an upper inlet port and lower outlet port. Honey enters the inlet port and flows downward across a series of zig-zagged trays to the outlet port. Expanded metal screens on each tray spread the honey uniformly across the trays. A fan unit circulates air within the housing through an evaporator coil and heater, which dry and warm the air. The warm dry air absorbs moisture from the flowing honey.

8 Claims, 3 Drawing Sheets

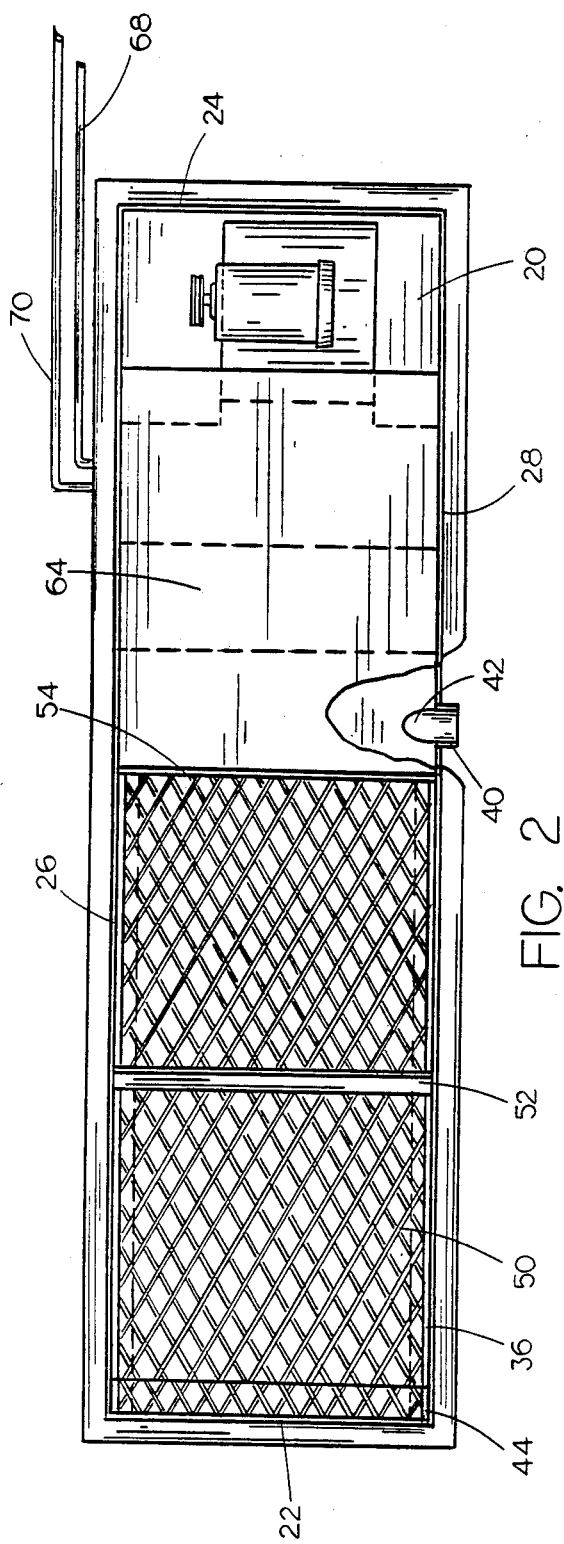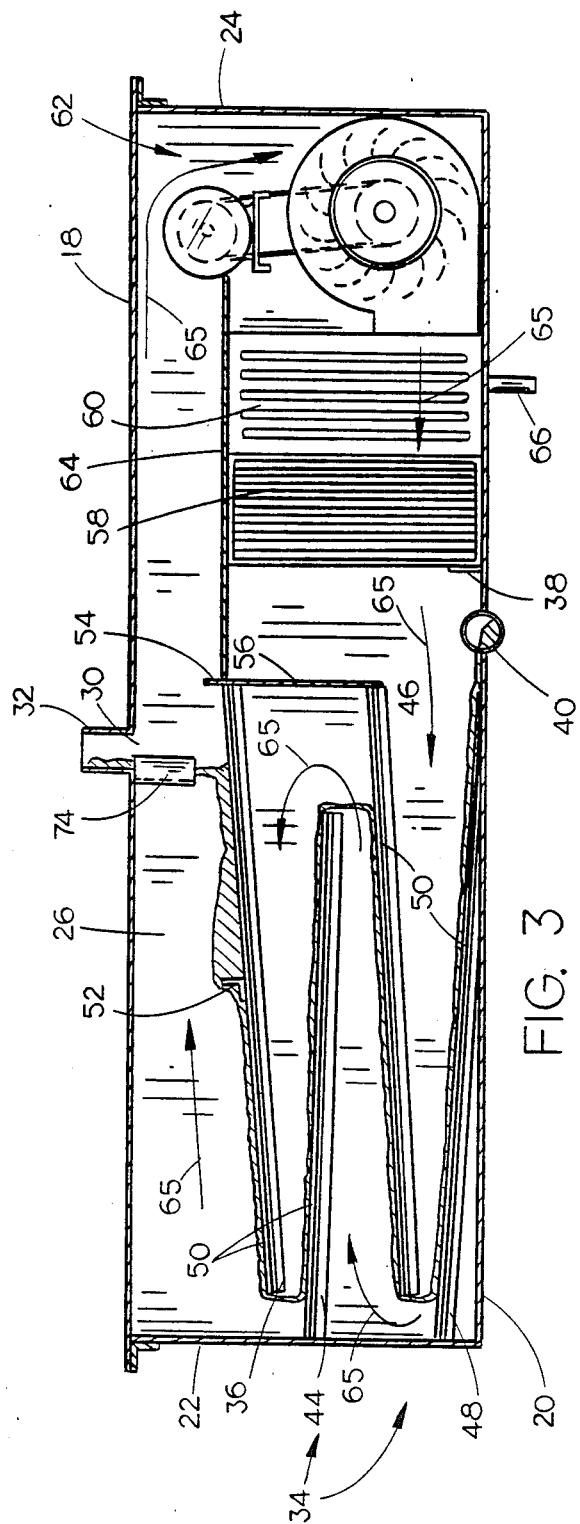

APPARATUS FOR REMOVING MOISTURE FROM HONEY

TECHNICAL FIELD

This invention relates generally to moisture removing apparatus, and more particularly to moisture removing apparatus for decreasing the moisture content of liquid honey.

BACKGROUND OF THE INVENTION

Honey produced by bees in a honeycomb has a moisture content which will vary from one area of the country to another. In order to effectively store honey, the moisture content of the honey must be approximately 18.5% or below. Honey with a moisture content higher than this has a very limited life in storage.

Until recently, the government would purchase both "wet" and "dry" honey and then mix the two to obtain the appropriate moisture content necessary for storage. Because of new government regulations, however, the government will no longer accept wet honey. Thus, honey producers have had to mix the honey between themselves so as to obtain the appropriate moisture content, since there was no previously known method or apparatus for reducing the moisture content of liquid honey.

It is therefore an object of the present invention to provide an apparatus for reducing the moisture content of honey.

Another object of the present invention is to provide an apparatus for reducing the moisture content of honey which will provide adequate reduction of the moisture content in one pass.

A further object of the present invention is to provide a moisture reducing apparatus which is simple in operation and economical in manufacture.

Yet another object is to provide a moisture reducing apparatus which is adjustable in the amount of moisture it removes from the liquid honey.

These and other objects will be apparent to one skilled in the art.

SUMMARY OF THE INVENTION

The apparatus for reducing moisture in liquid honey of this invention includes an enclosed housing with an inlet port in the top, and an outlet port at the bottom. Honey enters the inlet port and flows across a series of trays arranged in a zig-zag pattern within the housing. Expanded metal screens on the upper surface of each tray causes the honey to spread from side-to-side and flow uniformly through the housing. A fan unit within the housing recirculates air across the honey flowing down the trays. An evaporator coil drys the recirculated air by condensing moisture, and a heater unit warms the dry air to increase its moisture-absorbing capabilities.

BRIEF DESCRIPTION OF THE DRAWINGS

FIG. 2 is a top view of the invention with the top removed;

FIG. 3 is a side elevational view of the invention with the side removed;

DESCRIPTION OF THE PREFERRED EMBODIMENT

Figure 5:
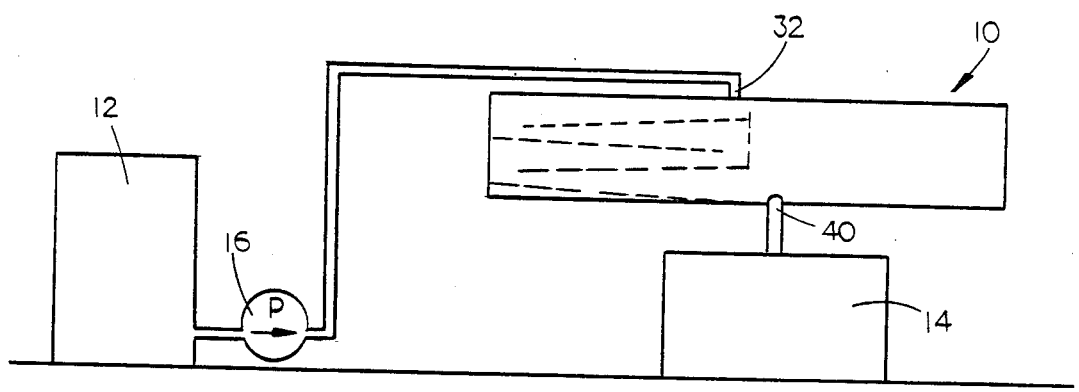
FIG. 5 is a schematic diagram showing the preferred location of the moisture reducing apparatus in relation to a honey extractor and storage unit.

Referring now to the drawings, in which corresponding parts are identified with the same reference character throughout the drawings, and more particularly to FIG. 5, the honey moisture reducing apparatus of this invention is designated generally at 10 and receives liquid honey from an extractor 12, or other honey source, and discharges the honey into a storage tank 14. The arrangement shown is preferred since the pump 16 which is utilized to move the honey from the extractor 12 to the storage tank 14 is also used to supply honey to the moisture reducing apparatus 10, thereby eliminating the need for an additional pump. The honey will flow by gravity into storage tank 14.

Referring now to FIGS. 1-4, moisture reducing apparatus 10 includes a rectangular enclosed housing 16 including a top 18, a bottom 20, right end 22, left end 24, front side 26, and rearward side 28. An entrance port 30, generally centered in the top side 18 of housing 16 is supplied with liquid honey by a conduit 32 coming from a source of wet honey, such as honey extractor 12 (shown in FIG. 5). A plurality of inclined planar trays 34 are arranged in zig-zag arrangement within housing 16. The upper end of the upper tray 36 is located directly under entry port 30. Trays 34 are arranged such that honey will gravity flow down each zig and each zag until reaching the bottom 20 of housing 16. A baffle 38 fastened to bottom 20 and spaced a short distance from the lower end of the lower most tray, will cause the honey to pool at the bottom.

An outlet port 40 in the rearward side 28 of housing 16 is located so as to drain any honey pooled adjacent baffle 38. A shallow channel 42 in bottom 20 assists in draining the honey from housing 16. In the embodiment depicted herein, four trays 34 are utilized for honey flow: an upper tray 36 slopes downward to a point adjacent to but spaced away from the right end 22; a second tray 44 below upper tray 36 inclined in the opposite direction and extending from right end 22 to a point generally beneath the upper end of upper tray 36; a third tray 46, located below the second tray and inclined parallel to upper tray 36; and a fourth tray 48 located below third tray 46 and inclined parallel to second tray 44.

Each tray 34 has an expanded metal screen 50 covering its upper surface. Screens 50 serve to spread the honey evenly from side to side as the honey flows down the incline of each tray 34. Screens 50 also serve to increase the surface area of flowing honey which is exposed to the drying air flowing within the housing 16, to be discussed in more detail below. Increased surface area is caused by the flowing of the honey over the expanded metal screens 50, thus causing "rippling" in the flow of honey.

A small baffle 52 extends transversly across top tray 36 and assists in the uniform spreading of the honey transversly across the tray 36 by causing the honey to pool therebehind. Another baffle 54 is located at the upper end of upper tray 36 and serves to hold honey from overflowing over the upper end of tray 36.

A partition wall 56 extends between the upper end of upper tray 36 and the upper end of the third tray 46, and between the front and rear walls 26 and 28, to define a zig-zag air passage through trays 34.

A heater unit 58, evaporator coil unit 60, and fan unit 62 are mounted within housing 16 between baffle 38 and left end 24. A cover 64 extends from the upper end of upper tray 36, over the top of heater unit 58 and evaporator coil unit 60 and is attached to the housing 16 such that an air passage is formed through which air within housing 16 is circulated from the fan unit 62 through evaporator coil unit 60 and heater unit 58, over tray 34 and back to fan unit 62 over the cover 64. This air flow is shown by arrows 65.

Fan unit 62 may be of any conventional type, such as the "squirrel cage" type shown here. Fan unit 62 is located adjacent the left end 24 of housing 16 and maintains the circulation of drying air within housing 16. Air which has passed over the honey and absorbed moisture therefrom is drawn through fan unit 62 and forced through evaporator coil unit 60 so as to dry the air.

Evaporator coil unit 60 may be of any conventional type. A drain 66 located in the floor serves to drain away any moisture removed from the air. Evaporator coil unit 60 includes an input line 68 and output line 70 for carrying heat transfer medium from a compressor 72 (see FIG. 1). The heat transfer medium is evaporated in the evaporator coil unit 60 so as to cool the air passing therethrough, and thereby cause moisture in the air to condense. Compressor 72 may be located a distance from the actual moisture reducer 10, so as to reduce the noise around the moisture reducer 10 during operation.

After the air passes through evaporator coil unit 60 it is forced through heater unit 58 of any conventional type. The heater unit 58 heats the cooled, dried air from evaporator coil unit 60, thereby increasing the moisture-absorbing capabilities of the air. The warm dry air which passes over and through the honey has an increased moisture-absorbing efficiency due to the uniform spread of the honey transversly across screens 50, the increased area of contact between the air and honey due to the "ripples" of honey over screens 50, and due to the length of "run" of the honey downward across the zig-zagged trays 34.

Figure 1:
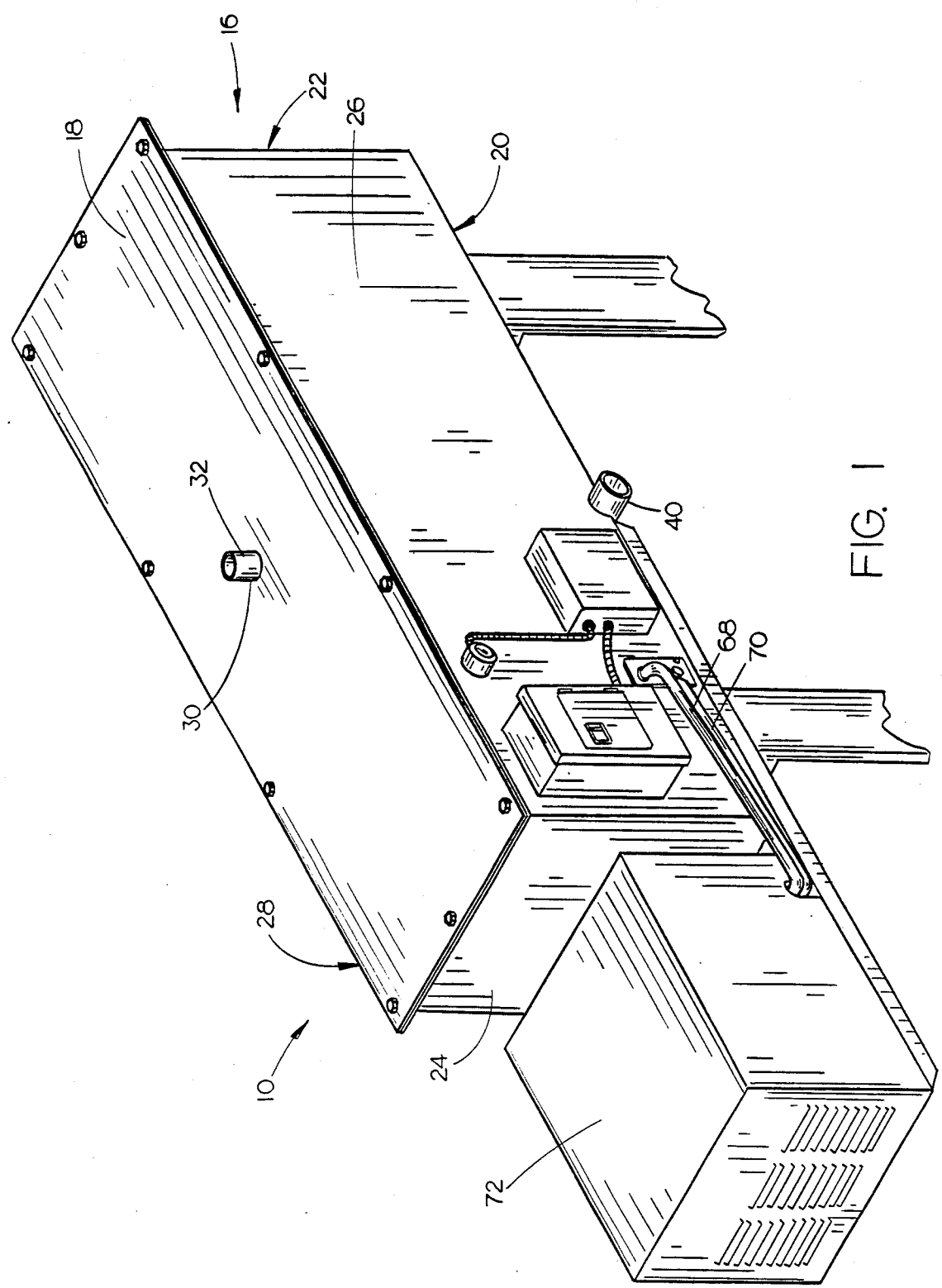
FIG. 1 is a perspective view of the moisture reducing apparatus of this invention.
Figure 4:
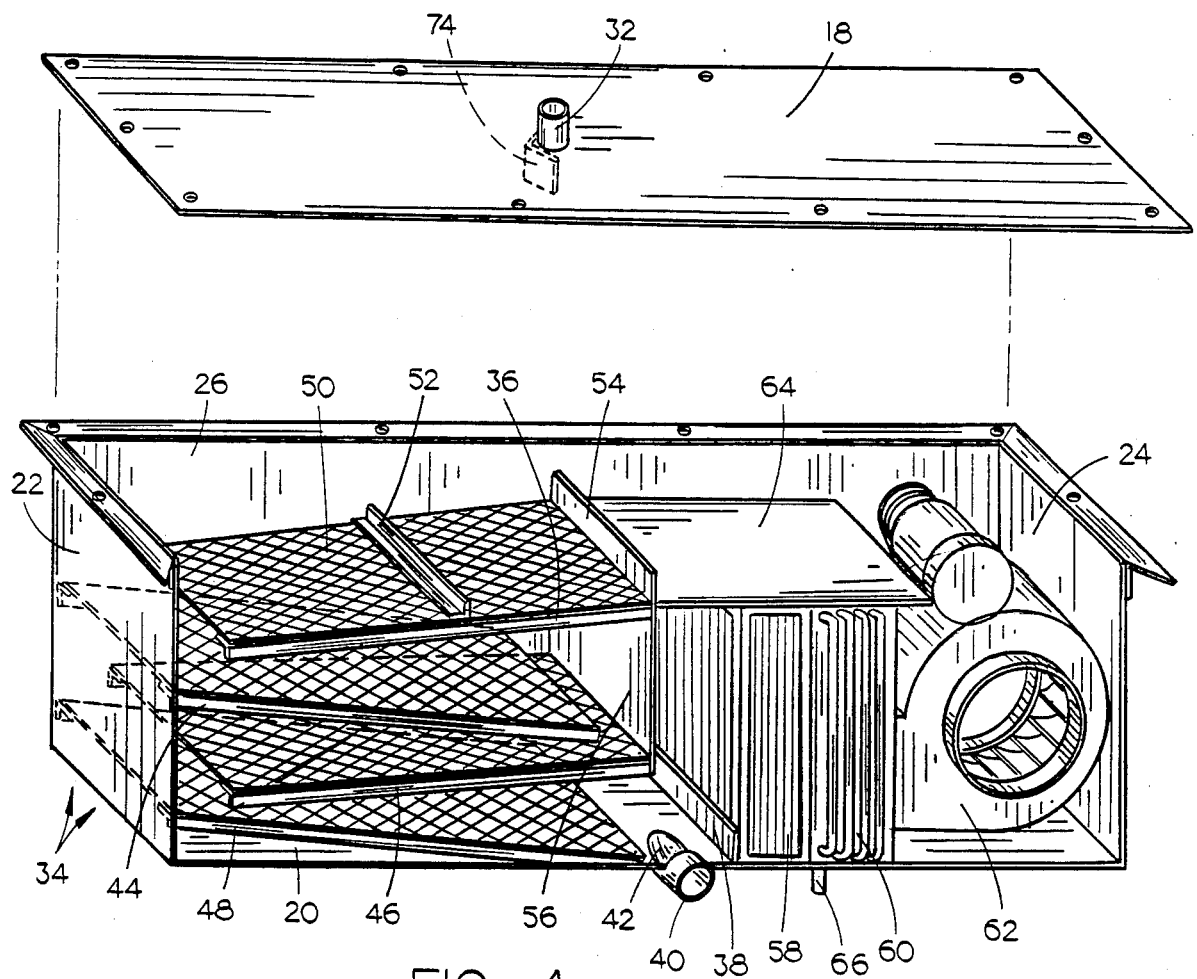
FIG. 4 is a sectional perspective view of the invention with its top cover removed.

An air deflector 74 depends from the housing top side 18, as seen in FIGS. 3 and 4. Deflector 74 is generally "V"-shaped, and extends downwardly to within close proximity of upper tray 36. Deflector 74 is oriented so that air circulating through housing 16 will not directly impact upon honey entering the housing 16 through inlet port 30.

Under typical operating conditions, wherein wet honey enters the moisture reducer 10 at about 90° Fahrenheit, wherein the air circulates at about 1000 cubic feet per minute, wherein the air has a warmed temperature of about 120° F., and wherein the honey flows through the reducer 10 at about 1.8 gallons per minute, the moisture content of 20% wet honey is reduced to about 18.5%, in one pass through reducer 10. Clearly, these rates and moisture reducing capabilities may be adjusted as desired by adjusting the temperature of the air (via the heater 58); adjusting the velocity of the air circulation; adjusting the flow rate of the honey through the reducer 10; or passing the honey through more than one reducer 10.

It can therefore be seen that the device of this invention accomplishes at least all of the stated objectives.

I claim:

1. An apparatus for reducing the moisture content of liquid honey, comprising:
   an enclosed housing means having inlet and outlet port means;
   means for supplying liquid honey to said inlet port means;
   inclined tray means mounted within said housing for carrying a flow of honey from its upper end to its lower end;
   expanded screen means extending across the upper surface of said tray means to cause lateral spreading and an undulating surface in honey flowing thereacross;
   said inlet port means being in operative fluid communication with the upper end of said tray means;
   said inlet port means being in opeative fluid communication with the upper end of said tray means;
   said outlet port means being in operative fluid communication with the lower end of said tray means;
   means for contacting drying air to honey flowing through said housing means and across said tray means from the inlet port means to the outlet port means;
   means for recirculating said air within said housing; and
   means for drying said air after contacting said honey.

2. The moisture reducing apparatus of claim 1, wherein said means for contacting drying air to the honey includes:
   fan means mounted within said housing, adapted to circulate said air within said housing, said fan means having an intake portion and an exhaust portion;
   said tray means being adapted to form an air passageway between the intake portion and exhaust portion of said fan means; and
   means for drying the air circulated within said housing, said air drying means being positioned between said fan exhaust portion and said tray means.

3. The moisture reducing apparatus of claim 2, further comprising means for heating air which has passed through said air drying means.

4. The moisture reducing apparatus of claim 1, wherein said tray means comprises a plurality of generally planar trays arranged in a zig-zag orientation, such that honey flows from one tray to the next and reverses direction upon flowing to each tray.

5. The moisture reducing apparatus of claim 4 further comprising a baffle extending transversely across the uppermost tray and projecting upwards a distance to cause honey to pool therebehind without flowing over the upper end of said uppermost tray.

6. The moisture reducing apparatus of claim 2, wherein said air drying means includes an evaporator coil means for condensing moisture in air passing therethrough.

7. An apparatus for reducing the moisture content of liquid honey, comprising:
   housing means having inlet and outlet port means;
   means for supplying liquid honey to said inlet port means;
   at least inclined tray means mounted within said housing for carrying a flow of honey from its upper end to its lower end;
   expanded screen means extending across the upper surface of said tray means to cause lateral spreading and an undulating surface in honey flowing throttlers;
   said inlet port means being in operative fluid communication with the upper end said tray means;

said inlet port means being in opeative fluid communication with the upper end of said tray means; and means for supplying drying air to the interior of said housing means;

means for contacting the drying air with the honey flowing on said tray means.

8. The apparatus of claim 7 wherein said tray means comprises a plurality of vertically spaced inclined tray members.

* * * * *